US010013037B1

(12) United States Patent
Clidaras et al.

(10) Patent No.: US 10,013,037 B1
(45) Date of Patent: Jul. 3, 2018

(54) LARGE-SCALE POWER BACK-UP FOR DATA CENTERS

(71) Applicant: GOOGLE LLC, Mountain View, CA (US)

(72) Inventors: Jimmy Clidaras, Los Altos, CA (US); Cornelius B. O'Sullivan, Mountain View, CA (US); Anand Ramesh, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 15/481,722

(22) Filed: Apr. 7, 2017

Related U.S. Application Data

(63) Continuation of application No. 14/040,372, filed on Sep. 27, 2013, now Pat. No. 9,618,991.

(60) Provisional application No. 61/706,607, filed on Sep. 27, 2012.

(51) Int. Cl.
| | |
|---|---|
| *H02J 9/00* | (2006.01) |
| *G06F 1/26* | (2006.01) |
| *G06F 1/30* | (2006.01) |
| *G06F 1/32* | (2006.01) |
| *G06F 13/40* | (2006.01) |
| *H02J 3/38* | (2006.01) |
| *H02J 3/46* | (2006.01) |
| *H02J 3/00* | (2006.01) |

(52) U.S. Cl.
CPC .............. *G06F 1/266* (2013.01); *G06F 1/305* (2013.01); *G06F 1/3209* (2013.01); *G06F 1/3287* (2013.01); *G06F 13/4086* (2013.01); *H02J 3/381* (2013.01); *H02J 3/46* (2013.01); *H02J 3/00* (2013.01)

(58) Field of Classification Search
USPC ............................................. 307/62, 64, 82
See application file for complete search history.

(56) References Cited

U.S. PATENT DOCUMENTS

| | | | |
|---|---|---|---|
| 7,492,057 B2 | 2/2009 | Baldwin |
| 7,560,831 B2 | 7/2009 | Whitted |
| 7,851,950 B1 | 12/2010 | Morales |
| 8,378,530 B1 | 2/2013 | Morales |
| 8,588,989 B1 | 11/2013 | Heath |
| 8,624,433 B2 | 1/2014 | Whitted |
| 8,638,008 B2 | 1/2014 | Baldwin |
| 8,994,231 B1 | 3/2015 | Corhodzic |

(Continued)

FOREIGN PATENT DOCUMENTS

| | | |
|---|---|---|
| CN | 101501596 A | 8/2009 |
| WO | WO2008077028 A | 6/2008 |

(Continued)

OTHER PUBLICATIONS

Kuan and Warwick, "Power distribution network design aided by an expert system," Power Engineering Journal 4(2):79-86, Mar. 1990.

*Primary Examiner* — Danny Nguyen
(74) *Attorney, Agent, or Firm* — Fish & Richardson P.C.

(57) ABSTRACT

A method for providing electrical power to a computer data center includes generating alternating-current power by a plurality of generators and converting the alternating current power from each of the generators to direct current power; combining the direct current power from each of the generators into a common electrical domain; and supplying the computer data center using the combined direct current power.

22 Claims, 6 Drawing Sheets

(56) References Cited

U.S. PATENT DOCUMENTS

| | | | |
|---|---|---|---|
| 2005/0200205 A1* | 9/2005 | Winn | H02J 9/062 |
| | | | 307/64 |
| 2007/0046103 A1 | 3/2007 | Belady | |
| 2007/0278860 A1 | 12/2007 | Krieger | |
| 2011/0006607 A1 | 1/2011 | Kwon | |
| 2011/0156480 A1 | 6/2011 | Park | |
| 2011/0304211 A1 | 12/2011 | Peterson | |
| 2012/0007430 A1 | 1/2012 | Humphrey | |
| 2012/0049634 A1 | 3/2012 | Babb | |
| 2012/0056481 A1 | 3/2012 | Corhodzic | |
| 2012/0140415 A1 | 6/2012 | Driggers | |
| 2013/0007515 A1 | 1/2013 | Shaw | |
| 2013/0022040 A1 | 1/2013 | Davis | |
| 2015/0074431 A1* | 3/2015 | Nguyen | H02J 3/006 |
| | | | 713/300 |

FOREIGN PATENT DOCUMENTS

| | | |
|---|---|---|
| WO | WO2009012451 A | 1/2009 |
| WO | WO2009137070 A | 11/2009 |
| WO | WO2011081850 A | 7/2011 |
| WO | WO2013000075 A | 1/2013 |
| WO | WO2013070104 A | 5/2013 |

\* cited by examiner

LARGE-SCALE POWER BACK-UP FOR DATA CENTERS

CROSS-REFERENCE TO RELATED APPLICATIONS

This application is a continuation of U.S. application Ser. No. 14/040,372, filed on Sep. 27, 2013, entitled "Large-Scale Power Back-Up for Data Centers," which claims priority to U.S. Provisional Application Ser. No. 61/706,607, filed on Sep. 27, 2012, entitled "Large-Scale Power Back-Up for Data Centers," the entire contents of which are hereby incorporated by reference.

TECHNICAL FIELD

This document relates to electrical power systems for computer data centers.

BACKGROUND

The popularity and simplicity of sharing information over networks, such as the Internet, has resulted in a high demand for data processing and storage capacity to support high network traffic volume. One mechanism to address this demand is the computer data center. A computer data center is a facility of one or more buildings in which are installed a large number (e.g., thousands, tens of thousands, or more) of computer servers that are connected to receive, process, and respond to requests from other devices connected to the Internet or other networks. For example, a computer data center may house server systems that respond to search requests, that provide email and similar services that stream music to registered users, and the like. Computer data centers may also be deployed in other contexts. Financial institutions, for example, may employ one or more computer data centers to store financial account and transaction information or to carry out trades with electronic markets.

The massive computing needs of a computer data center can lead to massive electric power requirements. For example, modern large computer data centers can demand tens of megawatts of electricity when operating, or even more. The cost of obtaining such large amounts of electricity can be very high, and the equipment needed to distribute the electricity to computer systems in the computer data center can be expensive and complex.

SUMMARY

This document describes systems and techniques that may be used to provide electric power to computer systems in a computer data center. Particular examples discussed below relate to the provision of back-up electrical power when primary power for a computer data center fails, and to the process of switching the supplied power from primary power, to battery back-up, and then to secondary back-up power. Such switching can traditionally require a relatively long time to be achieved because back-up power is often provided by engine-powered alternating current (AC) generators that need to be started and brought up-to-speed, and subsequently need to be adjusted so that AC power that they are delivering can be aligned in phase, as between each of multiple generator sets (e.g., a gasoline, natural gas, or similar engine combined with a generator, and perhaps other components) in a group that provides back-up power. Such switching can also be less reliable because phasing is accomplished through a central controller that acts as a single point of failure.

In some examples discussed below, a plurality of generator sets may be provided for back-up power, and the AC power produced by each generator set may be converted to direct current (DC) power (e.g., with a rectifier for each generator set) before the power from the various generator sets is combined and provided for use in the computer data center. The generator sets may also produce native, or direct, DC output, and may be implemented in a generator-on-generator arrangement to produce DC power. In some examples, the generator sets each involve an engine connected to a rotating electrical generator of a standard form, while in other examples, the generator sets may be made up of co-gen facilities, turbines, fuel cells or other appropriate generators of back-up electricity. Where the generator sets produce AC electricity, it may be converted to DC form before being combined, as discussed herein, while if they natively generate DC power, no such conversion (e.g., rectification) may be required. As a result, the back-up generator sets may, in certain implementations, be operated asynchronously with respect to each other even as their power is combined together.

Such DC power may then be provided, through a common medium voltage (MV) domain, to the computer data center, and converted at locations at or close to the computer systems (e.g., at each server, bay, or rack (where a rack may be made up of one or more bays)) to low voltage power. Alternatively, the combined power from the generator sets can be inverted into AC power after it is combined in DC form, and then be provided for distribution within a data center as AC power that is then converted to DC power (e.g., at each motherboard, row, rack, or bay).

In other examples discussed below, generator sets may be used as a primary power source, and utility power may be used as a back-up power source. As discussed here, a primary power source is a power source arranged to be used (and is actually used) to power the facility the great majority of the time (more than 75%, 80%, 90% or 95% of the time), and is part of a system designed to switch power from the primary power source when there is a failure or other problem with the primary power source. To that end, a back-up power source is one that is used to take over at least some of the facility load when the load is switched from the primary power source.

As the generator sets are operated, they may be aligned with each other in their AC power phasing, and may be aligned with the prevailing phasing from the electric grid from the utility (which alignment may be determined by monitoring the grid while the generator sets are operating). In this manner, when the grid needs to be used as a back-up power source to the generator sets, the switchover may occur readily without a need to further align the phasing of the AC power for delivery to the computer data center. In certain such examples, the generators may be used as a primary power source during peak power periods for the local utility (or either the grid or on-site generation can be used for peak shaving while the other services the base load of a facility), so that the data center operator may more economically generate its own electricity during such periods (e.g., by obtaining rebates for having such capabilities available and/or because rates may be higher for commercial power in such times compared to costs for generating private power, particularly where the privately-generated power uses a fuel source that has fallen in price for a limited time period (e.g., natural gas) so that the utility is not able to use such a temporarily lower-cost fuel, and is at least temporarily not price competitive.

In certain discussion here, distinctions may be made between utility or grid power, and local or on-site power. Unless otherwise stated, utility or grid power is power provided generally to a number of customers by a utility, and its generation and control are handled by the utility. Such utility power may also be generated a long distance from the data center facility. Local or on-site power is used, for the most part, only by facilities at the data center site, and is under control of an operator of the data center site, as opposed to a broader utility company. On-site power may generally include a generator farm at the same property as the data center farm (e.g., a large bank of engine-powered generators, fuel cells, or solar cells) or near the facility, with an essentially dedicated power connection to the facility (e.g., a situation in which a data center contracts to purchase a certain amount of power from a nearby windfarm, and power connections are made directly through the farm and to the data center site without going through the general utility electrical grid).

In certain implementations, the features discussed here may provide one or more advantages. For example, "cut over" from primary power to back-up power for a data center may occur quickly, without a need to align the phase of power provided by a back-up power system. Such faster cut over may allow temporary power supply sources such as batteries to be smaller and less expensive, or permit continued operation through a changeover where such continued operation might not have been available otherwise. In addition, reliability can be improved by eliminating a single point of failure that might otherwise exist in other implementations (e.g., in terms of a paralleling/synchronization controller). Also, although rectification and inversion may be involved in certain examples and may lower the efficiency of a power supply system, the time duration of use of a back-up power system will generally be limited so that efficiency concerns will not result in a significant increase in energy usage and costs. Moreover, implementations may provide for a flexible back-up power system that can use local private power as back-up power, or alternatively use public utility power as back-up power, depending on the current conditions that prevail. Moreover, such generation schemes may be particularly beneficial when the data center uses very few electrical domains that are very large (e.g., 15 MW, 30 MW, or higher MV domains, where a domain is a single supply of energy on joined conductors that can flow freely, without having to pass through transformers or other blocking structures), because tying together so many generator sets may be key to supplying a large pool of power into the large domain.

In one implementation, a method for providing electrical power to a computer data center comprises generating alternating-current power by a plurality of generator sets and converting the alternating current power from each of the generator sets to direct current power; combining the direct current power from each of the generator sets into a common electrical domain; and supplying the computer data center using the combined direct current power. The method can also include identifying an interruption in power from an electric power grid, beginning operation of the generator sets in response to the identifying, switching power delivery to the computer data center from the electric power grid to the generator sets. In addition, the method can comprise inverting the direct current power into alternating current power before supplying the computer data center. The generator sets can produce electric power at medium voltage and the computer data center can be served by one or more medium voltage-to-low-voltage transformers that each serve a predefined sub-portion of the data center. Each of the generator sets can serve a predetermined number of rows of computer racks in the computer data center. Also, the alternating current power can be provided to a common electrical bus.

In some aspects, the common electric bus is part of a single medium voltage domain in the computer data center that serves more than one-hundred medium-voltage-to-low-voltage converters, or that is larger than three or ten megawatts in size (though smaller than 200 megawatts). Also, the common electrical bus can be part of a single medium voltage domain in the computer data center that serves more than about half of the computer data center, and wherein the computer data center has a designed electric load of more than thirty megawatts.

In another implementation, a system for providing electrical power to a computer data center is disclosed, and comprises a plurality of electric generator sets proximate to the computer data center, each including an alternating-current-to-direct-current converter; a power bus arranged to receive direct current power from the generator sets and combine the received direct current power onto a common conductor; and a power distribution system in the computer data center to provide power from the electric generator sets to computer systems in the computer data center. The system can also include one or more inverters connected to convert the direct current power from the common conductor to alternating current power for distribution by the power distribution system. The system can also include a control and switching system to monitor one or more factors relating to power delivery from an electric grid, and to switch power supply to the computer data center from the electric grid to the generator sets upon the identification of a determined factor relating to power delivery from the electric grid.

In some aspects, the power distribution system includes a common electrical bus in a single medium voltage shared electric domain that is connected to the plurality of generators by a first electric switching structure and to the electric grid by a second switching structure that is interlocked with the first electric switching structure. The single medium voltage shared electric domain in the computer data center can serve more than one-hundred medium-voltage-to-low-voltage converters, and can be larger than three or ten megawatts in size, or can serves more than about half of the computer data center, where the computer data center has a designed electric load of more than thirty megawatts.

In yet another implementation in which back-up power is supplied from a utility grid, a method for providing electrical power to a computer data center is disclosed. The method comprises powering the computer data center using generator sets that are proximate to the computer data center, are employed as a primary power source that provides power to the computer data center a majority of the time, and are in asynchronous phase with respect to each other; monitoring an electric power grid that is capable of supplying electric power to the computer data center and controlling the generator sets to align AC power phase provided by the generator sets with AC power phase of the electric power grid; identifying occurrence of an event that requires access to back-up power that is exclusive of the generator sets; and switching electric power supplied to the computer data center from the generator sets to the electric power grid, in response to identifying the occurrence of the event. The generator sets can produce medium voltage power and be connected to one or more medium voltage-to-low-voltage transformers that serve a predefined sub-portion of the data center. The generator sets can also serve a predetermined number of rows of computer racks in the computer data center, and can comprise a plurality of generators that generate electric power in asynchronous phase to each other, and provide electric power to a common electric power bus that is used by a majority of the data center. The common electric power bus can be connected to the plurality of generators by a first electric switching structure, and to the electric grid by a second switching structure that is connected to operate in coordination with the first electric switching structure. Also, the common electric power bus can be part of a single medium voltage domain in the computer data center that serves more than fifty medium-voltage-to-low-voltage converters, or be part of a single medium voltage domain in the computer data center that is larger than three megawatts or ten megawatts in size. In certain aspects, the common electric bus is part of a single medium voltage domain in the computer data center that serves more than about half of the computer data center, and wherein the computer data center has a designed electric load of more than thirty megawatts.

In another implementation, a system for providing electrical power to a computer data center is disclosed. The system comprises a plurality of electric generator sets proximate to the computer data center and connected to provide power to the computer data center as a primary power source; a phase control system connected to monitor AC power phase of an electric power grid and to adjust operation of the electric generator sets to match AC power phase of power produced by the generator sets to the AC power phase of the electric grid while the generator sets provide primary power to the computer data center; a monitoring sub-system arranged to monitor supply of primary power to the computer data center and to identify events indicating interruptions in the supply of primary power to the computer data center; and a control sub-system programmed to respond to an indication from the monitoring sub-system by causing electrical power provide to the computer data center to be switched from the generator sets to the electric grid. The plurality of generator sets can produce medium voltage power and be connected to one or more medium-voltage-to-low-voltage transformers that serve a predefined sub-portion of the data center. The plurality of generator sets can also serve a predetermined number of rows of computer racks in the computer data center.

In certain aspects, the generator sets comprise a plurality of generators that are controlled to generate power in matched phase to each other, and to provide power to a common electrical bus that is used by a majority of the data center. The common electrical bus can connected to the plurality of generators by a first electric switching structure and to the electric grid by a second switching structure that is interlocked with the first electric switching structure, and can be part of a single medium voltage domain in the computer data center that serves more than fifty medium-voltage-to-low-voltage converters, or that is larger than three megawatts or ten megawatts in size. The common electrical bus can also be part of a single medium voltage domain in the computer data center that serves more than about half of the computer data center, and wherein the computer data center has a designed electric load of more than thirty megawatts.

In yet another implementation, a control system for controlling provision of electrical power to a computer data center is disclosed. The control system comprises one or more computer processors, and one or more machine-readable storage media. The media have recorded thereon instructions, that when executed by the one or more computer processors, perform operations that comprise monitoring provision of primary power to the computer data center by a plurality of generator sets; identifying occurrence of an event that requires access to back-up power that is exclusive of the generator sets; and causing electrical power supplied to the computer data center to be switched from the generator sets to the electric grid, in response to identifying the occurrence of the event. The plurality of generator sets can produce medium voltage power and each be connected to one or more medium-voltage-to-low-voltage transformers that serve a predefined sub-portion of the data center. Also, each of the plurality of generator sets can serve a predetermined number of rows of computer racks in the computer data center. In addition, the generator sets can comprise a plurality of generators that are controlled to generate power in matched phase to each other, and to provide power to a common electrical bus that is used by a majority of the data center.

In certain aspects, the common electrical bus is connected to the plurality of generators by a first electric switching structure and to the electric grid by a second switching structure that is interlocked with the first electric switching structure. The common electrical bus can also be part of a single medium voltage domain in the computer data center that serves more than one-hundred medium-voltage-to-low-voltage converters. Moreover, the common electrical bus can be of a single medium voltage domain in the computer data center that is larger than three or ten megawatts in size, or can serve more than about half of the computer data center, where the computer data center has a designed electric load of more than thirty megawatts.

Other features and advantages will be apparent from the description and drawings, and from the claims.

DETAILED DESCRIPTION

This description discusses systems and techniques for providing electric power to large-scale computer data centers. Certain examples described here involve solutions for transitioning between primary power and back-up power, such as when a system determines that the primary power has failed or is about to fail. In some situations, the back-up power may be inactive when a primary power failure occurs, so that mechanisms for providing the back-up power (e.g., a bank or farm of separate generators) need to be activated and placed in a condition that their power may be used. The techniques discussed here may be used to help lessen the amount of time that is required to make such a transition from primary to back-up power, which may be important if separate short-term back-up power supplies (e.g., batteries, including batteries that are located at the rack or tray level in a computer system) are not arranged to provide a long time period of back-up power.

In one example discussed here, traditional sources of back-up power can be employed as primary power, and a traditional source of primary power may be used as back-up power. For example, a bank of generators may provide primary power and may be controlled so that they are operated in phase with power on the electric grid even when the electric grid is not supplying power. When a switch is to occur to the grid, then, the phase will already be aligned, and the switch can occur relatively quickly. In another example discussed here, DC power may be generated by the various generators in a bank of back-up generators (either directly or via rectification) and, as such may be joined together in a single supply of power without having to wait for the phasing of the generators to be aligned. Such joined power may then be supplied to a data center (e.g., as back-up power when primary power fails) either directly or upon being converted to AC power (which can then be converted to DC power closer to the computing loads). In certain implementations, both of these examples may be employed in combination with each other.

Figure 1A:
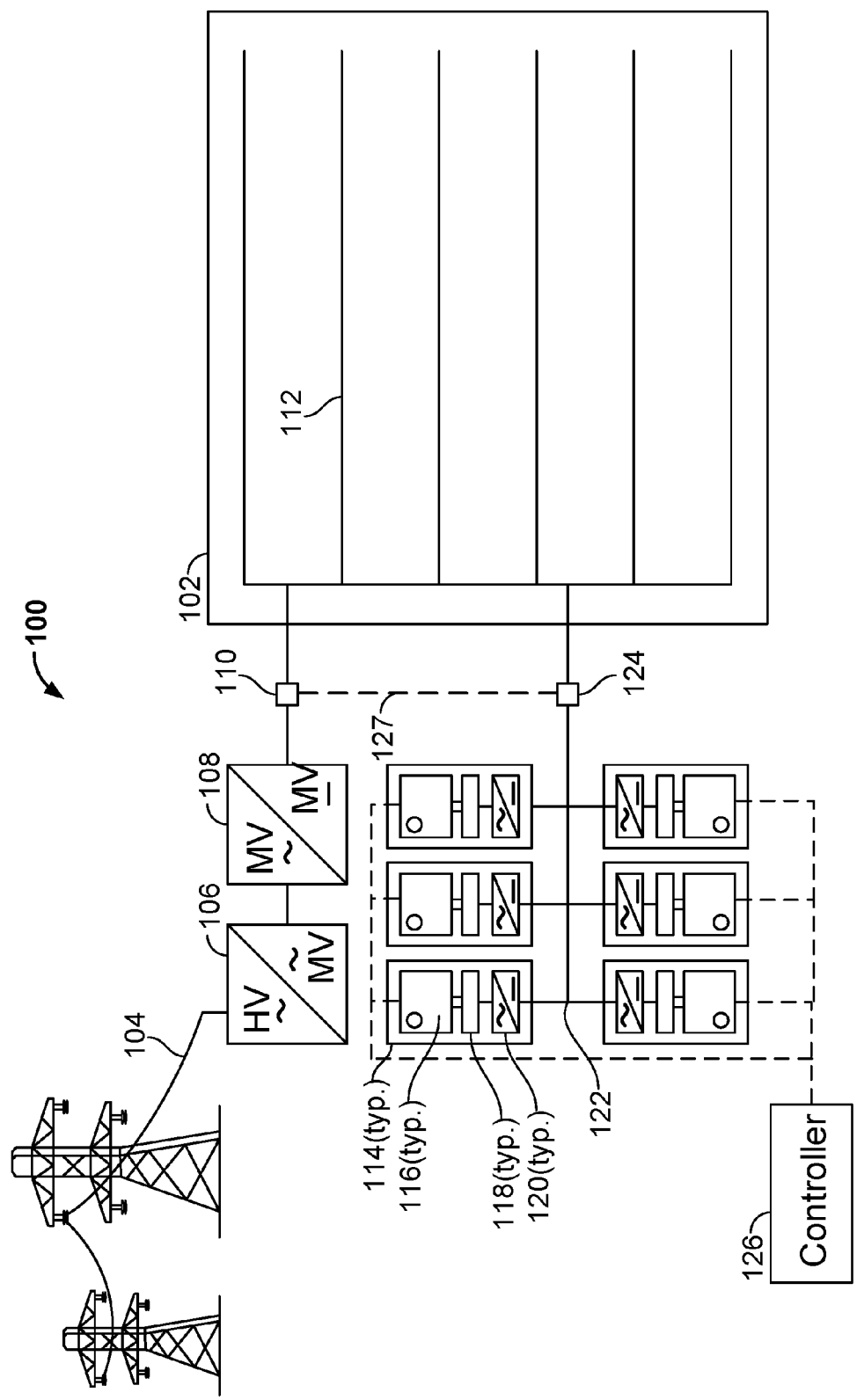
FIGS. 1A and 1B are schematic diagrams of electric distribution systems for computer data centers.
Figure 1B:
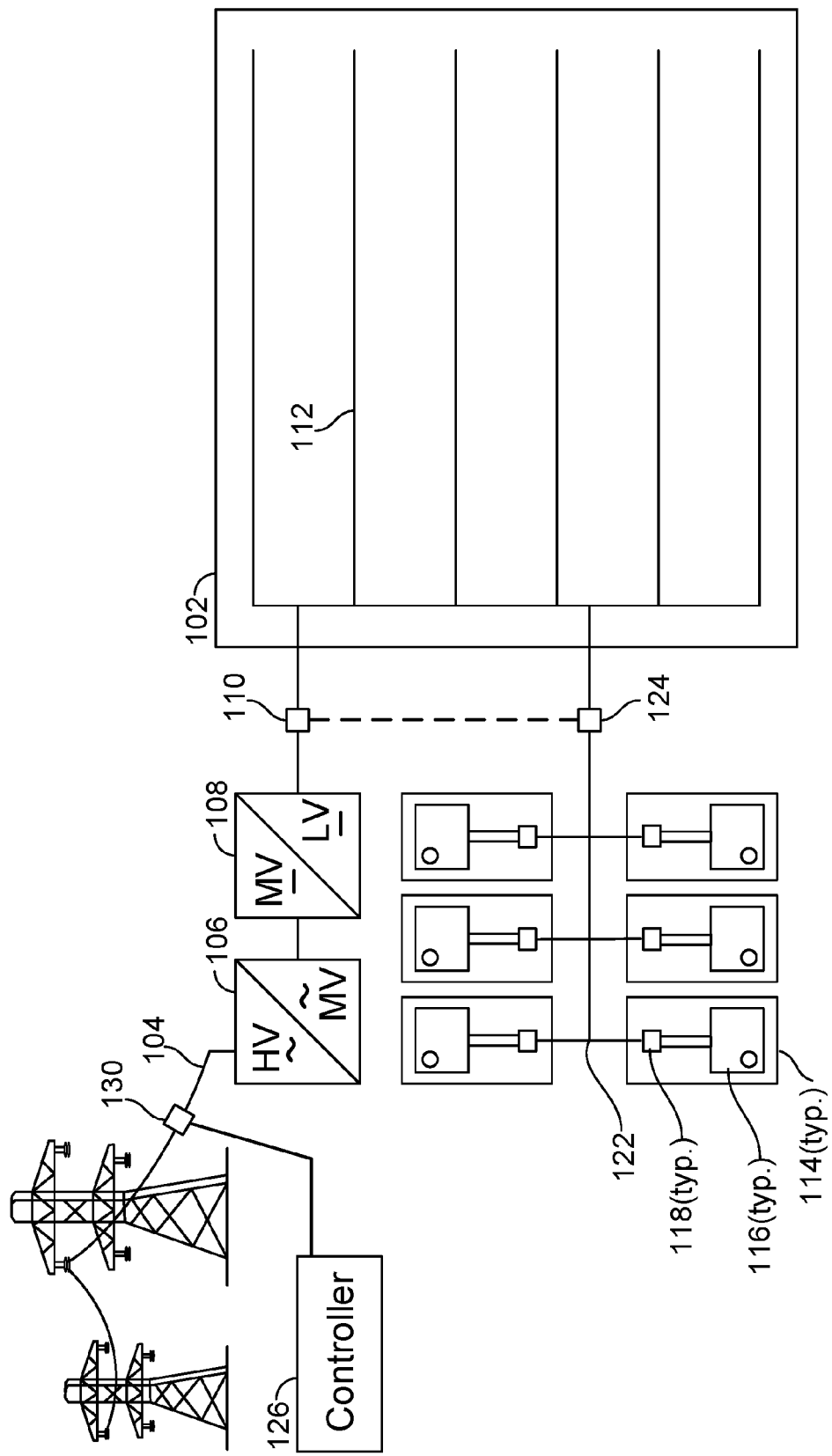

FIGS. 1A and 1B are schematic diagrams of electric distribution systems for computer data centers. In FIG. 1A, generator sets are used to provide back-up power. However, to avoid a relatively time-consuming process of aligning the AC phase of the power produced by the generator sets with each other, the power from those sets may first be rectified to DC power before it is combined (and then subsequently inverted in some implementations) and provided to the data center components that use electric power (or it may be produced initially as DC power). In FIG. 1B, generator sets are used to provide primary power (rather than back-up power), and as they operate, they are maintained in-phase with the prevailing phase of power on the local electric power grid. As a result, when the grid is to provide back-up power (e.g., a generator set fails, so that the remaining generator sets cannot supply all necessary power), a switch can be made quickly to utility power without introducing harmful transient effects into the system. (In this example, they may also have their power rectified or may produce DC power so that such coordination with the grid's power phase is not needed).

Referring now more specifically to FIG. 1A, there is shown a power distribution system 100 serving a computer data center 102 with electric power. Power enters the system via one or more high voltage power lines 104 from a public utility grid. In certain implementations, utility power may be received from two different sources, so as to provide diversity in the power supply for the computer data center 102.

The lines 104 connect electrically to one or more substations 106 that may include transformers or other converters that convert the power from high voltage AC to medium voltage AC. As used herein, high voltage power is above about 35 KV, while medium voltage extends from about 5 KV to about 35 KV, and low voltage is about 1000 Volts and below, such as 480 Volts.

In certain implementations, a rectifier 108 may be provided to convert medium voltage AC power to medium voltage DC power, where distribution throughout the computer data center 102 is to be via DC distribution components. Alternatively, the rectifier 108 may be omitted, and AC power may be provided into the data center 102. In such an implementation, a conversion from AC to DC may occur at power supplies for particular computers or groups of computer in the computer data center 102 (e.g., at the rack, bay, or board level, or at the level of n racks per group of power supplies).

The power is then fed through a breaker or other form of switch 110 to a distribution bus 112 inside the computer data center. In certain implementations, transformers for converting high voltage to medium voltage can also be inside the computer data center 102, as may transformers or other converters for converting medium voltage to low voltage power.

A common medium voltage domain may span across a substantial portion of the computer data center 102. For example, each of the branches shown for distribution bus 112 may carry medium voltage power, such as in the form of bus bars that are appropriately physically located high above a workspace in the computer data center 102, and above computer racks filled with servers in the computer data center 102. The branches may be a single medium-voltage domain, in that power may be able to flow freely between and among the branches because no active components, such as transformers or converter, are located to block such free flow of the current. Medium-voltage-to-low voltage converters (not shown) may, in such a situation, connect to bus bars that are located above respective rows of computer racks in the computer data center 102, and may connect on their low voltage sides to power strips that extend down along the front faces of respective computer racks that they serve with electric power. The power strips may then be plugged into by cords from particular servers on trays in the racks.

A back-up power system is provided separately from the utility power supply in the electric distribution system 100. The back-up power system comprises a plurality of generator sets, typified by generator set 114. In general, a generator set 114 includes an engine 116 that typically operates on a fuel like diesel fuel, gasoline, or natural gas. The engine 116 is connected to a generator 118 that produces AC electric power by being forced to rotate at high speeds by the engine 116. Generator sets may commonly be purchased as a package, and may also be acquired with integrated automatic control systems and other accessories. In this example, each generator set also includes a rectifier 120 that converts the AC electric power from the generator 118 into corresponding DC power. The DC power from all of the generator sets is then fed into a common DC bus 122. Such easy combination of power may be made because the DC power from one generator set does not need to be phase-matched to DC power from other generator sets in the manner that AC power would have to be.

The power from the generator sets may be provided to the computer data center through a breaker or other form of switch 124. As indicated by a dashed line, the switch 110 and the switch 124 may be interconnected by an interlock 127 so that power is provided to the computer data center 102 from only the primary source (the utility grid in this example) or only the back-up source (the generator sets in this example) at any particular moment. Thus, the interlock 127 causes the switches to be controlled in a coordinated manner to switch from a first main power source to a second main power source, and may be switched back when the first main power source is again available. For example, as one switch 110, 124 is switched so that its associated source of power delivers power, the other switch 110, 124 may be switched so that its source no longer delivers power, as a result of the action of the interlock 127. In appropriate implementations, the switches 110, 124 may be implemented in various manners (e.g., depending on the amount of current that is switched), and are shown here for convenience and clarity.

A controller 126 operates to activate the generator sets when back-up power is needed by the system. The controller 126 can be attached to a single generator set, or it may be attached to each of the generator sets and may control them in unison with each other, such as to align the phase of the AC electricity that they are producing and to cause them to power up and shut down when appropriate. For example, one controller may independently control each of the generator sets, or may communicate with other controllers that each control one or more of the generator sets. Thus, controllers may be arranged in a hierarchical arrangement by which a master controller communicates with, and controls, multiple slave controllers, and receives reports from the slave controllers about the status of their respective generator set or sets.

The controller 126 may also monitor, or may be in communication with a system that monitors, the status of the utility power. For example, the controller 126 may identify when the utility power has failed, is about to fail or be insufficient (e.g., via the utility sending a signal to the controller 126 instructing the controller 126 to switch to back-up power, such as during a peak energy use period), or is in the process of failing. Similarly, the controller 126 or a system that controls controller 126 may control other components of the system 100 in a coordinated manner, such as by controlling the interlock 127 in coordination with powering up the generator sets so that when the system 100 is ready to supply power from the generator sets, the switches 110, 124 are switched in a proper and timely coordinated manner.

In operation then, the computer data center 102 may operate under normal conditions by drawing power from the utility power grid through switch 110. At some point in time, sensors in substation 106 or elsewhere, such as computers in computer data center 102, may sense that the power supply has been lost or is otherwise in the process of failing or becoming inadequate. When that occurs, power supplies that serve particular server systems in the computer data center 102 may switch to temporary reserve battery back-up power—where the batteries may be distributed throughout the computer data center 102, such as at each rack or tray—and may operate off the battery power either to continue normal operation, to perform normal processing at a reduced rate so as to extend the battery life, or to begin shut-down operations such as by completing currently-running tasks, and saving in-process data to non-volatile storage.

Substantially simultaneously, the controller 126 (under control of a broader control system that receives data messages from the power supplies at the rack level) may identify the failure in power and may generate a signal for each of the engines in the generator sets to begin operating. It may take several seconds for the engines to "spin up," and a switch may be provided at each generator set to prevent it from providing power to the system before it is ready. Also, the controller 126 may coordinate the timing at which individual generator sets are brought on-line so as to prevent unnecessary and dangerous transients in the system. Similarly, the on-lining of computer servers in the computer data center 102 may be staggered to match the currently-available power from the generator sets and to similarly stagger demand so as to avoid problematic transients. At an appropriate time, switches 110 and 124 may be switched in coordination so that power is no longer being supplied from the utility grid, but is instead being supplied from the generator sets (in a generator farm). When the system determines that adequate power is again available from the utility grid, the switches 110 and 124 may be switched back to their original positions, and the generators may be shut down in an orderly manner.

FIG. 1B is similar to FIG. 1A, but involves generator sets that do not have rectifiers on them. Specifically, in this example, generator set 114 is typical and is connected to an AC power bus 122 directly from its generator 118. In such a case, the controller 126 does need to work to align the AC phases of the power generated by the various generator sets so that it can be combined properly on the AC power bus 122. (However, direct DC generation may be used so that the bus is a DC bus, and generator-to-generator creation of DC power may also be employed). Also, because AC power is used here, the phasing needs to be aligned if there is a live cut-over between the utility grid power system and the generator sets. Where the generator sets are used to provide back-up power, such a cut over may take minutes because of the need to start up the generator sets and to then get them in phase alignment.

Thus, the operation of the system in FIG. 1B is different than that described above for FIG. 1A. In particular, the generator sets in this example may be used as primary power sources and the utility grid may act as a back-up source. Specifically, the controller 126 may use a monitor 130 to identify the phase, or clock, for the utility grid and may adjust the generator sets as they are delivering primary power so that they operate in phase with the grid power, even though the computer data center 102 is not at the time receiving power from the utility grid. When a need arises to switch from the generator sets to the grid (e.g., because a system operating the controller 126 has determined that such a change would be economically feasible or because a generator set has failed and the generator sets cannot provide sufficient power to meet the current or expected demand of the computer data center 102), the switchover may be made readily by coordinating the change in switches 110 and 124.

Figure 2:
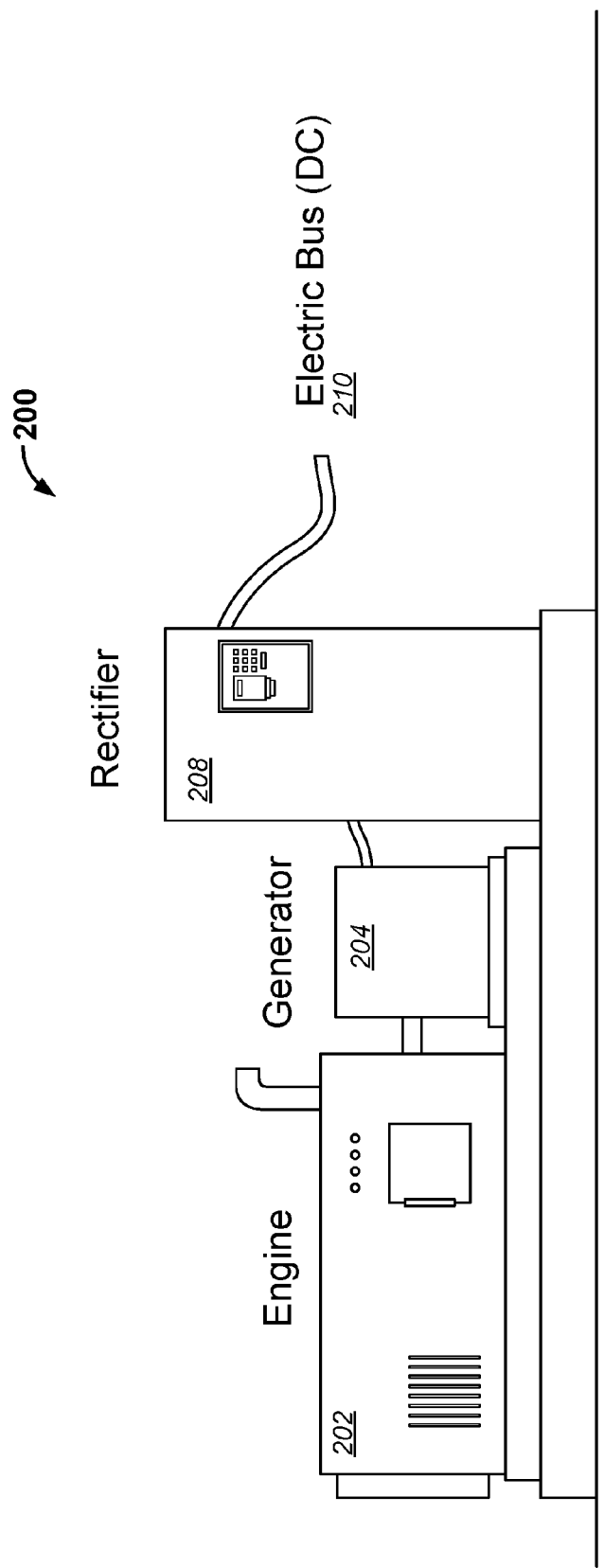
FIG. 2 shows a generator set arrangement for powering a computer data center.

FIG. 2 shows a generator set arrangement 200 for powering a computer data center. In this example, the generator set arrangement 200 is taken from the example implementation in FIG. 1A. At the left is an engine 202 that may take a variety of forms and is commercially available, joined to a generator 204. For example, diesel, gas, or natural gas-powered generator sets may be commercially acquired that produce AC power up to several MW. Because a large data center may require tens of MW at design capacity, a farm of generator sets may be required to provide even partial power to such a data center. Generally, generator sets are designed to be either continuous, back-up, or prime power supply systems, and thus would be selected in the examples discussed here according to their expected level of usage.

The generator set is extended here along a common mounting pad 206 to include a rectifier 208 that operates in a familiar manner to convert AC power received from the generator 204 to DC power. The rectifier 208 is in turn connected to a common electric bus 210 that is also connected to other generator sets in the server farm.

In certain implementations, an electric by-pass may be provided around the rectifier, with switches provided on the by-pass so that it can be controllably activated. For example, an operator of a computer data center may want to operate at times in a manner like that discussed for FIG. 1A, where the generator sets are developing DC power that is joined, and at other times in a manner like that discussed for FIG. 1B. In such a situation, an inverter by-pass would also need to be switched in a coordinated manner, in that the combined power from the generator sets would not have to be inverted before being provided to the computer data center if it was exiting the generator sets as AC power (and if the system was one in which AC power was to be provided to the computer data center).

Figure 3A:
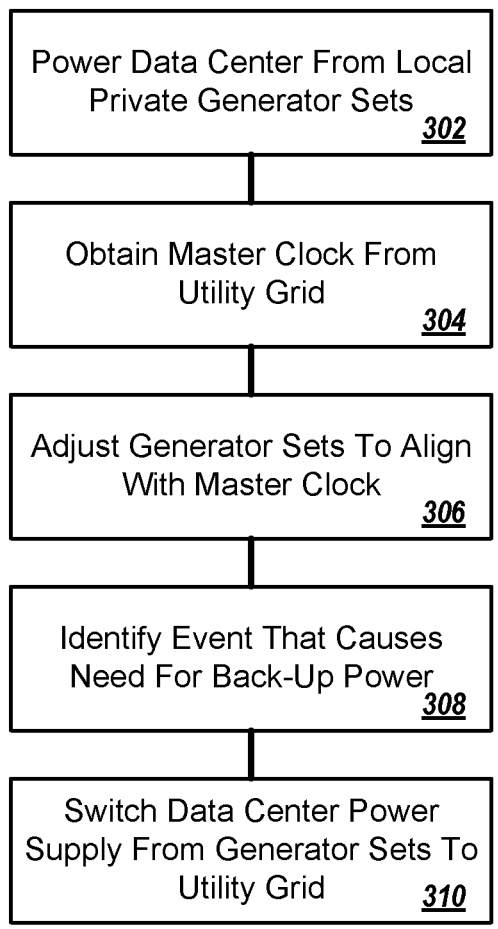
FIGS. 3A and 3B are flow charts of processes for providing back-up power to computer data centers.
Figure 3B:
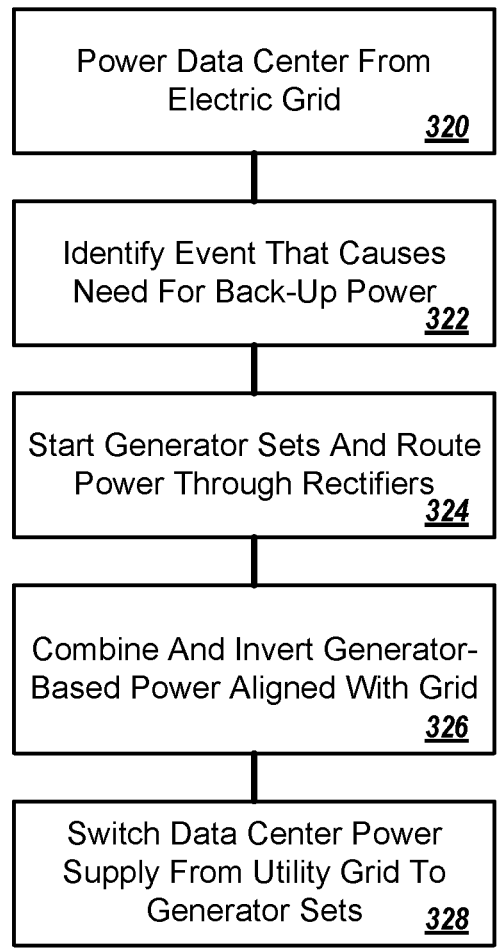

FIGS. 3A and 3B are flow charts of processes for providing back-up power to computer data centers. Referring specifically to FIG. 3A, the process here generally involves the use of generator sets as primary power, and utility grid power as back-up power in a coordinated manner.

The process begins at box 302, where a computer data center is powered from a farm of generator sets that are operated local to the data center by the same operator that runs the computer data center. The generator sets may be arranged to each provide power to a common power bus or similar structure in the computer data center. The generator sets may be operated for extended periods of time (e.g., hours or days or more) to provide all of the power needs for the data center. The power supplied by the generator sets may be uniform phase-matched AC power that enters the data center, or may be rectified to DC power before it enters the data center and is distributed therein.

At box 304, the system obtains the master clock that defines the AC power phasing for the utility grid. Such a step may permit a controller that operates with the system to then adjust the generator sets, at box 306, to align with the master clock. The actions represented by boxes 304 and 306 may be repeated frequently over time to ensure that changes in the master clock are reflected in the continuing operation of the generator sets, and that the generator sets stay constantly in substantial phase alignment with the utility grid power.

After operating in this manner for some undefined time period, the system may identify that an event has occurred that causes a need for back-up power. For example, the generator sets may be run on an operating schedule that requires that they be rested every X hours or Y days. Similarly, the generator sets may have a maintenance schedule that requires them to be taken out of service every X days or Y months (e.g., to change filters and fluids and to test system components). Alternatively, fuel to the generator sets may be interrupted or one or more generator sets may otherwise fail so that the capacity of the combined generator sets falls below the expected near-term future demand for the computer data center. Such events may be identified by a controller for the system, such as by a maintenance or operational calendar monitored by the controller or a system with which the controller communicates, or by monitoring the operation of particular generator sets or the electric supply provided from a generator farm to the computer data center. Various other mechanisms may also be used to identify when power supply needs to switch from the generators sets to the utility grid.

At box 310, the system switches the power supplied to the computer data center from the generator sets to the utility grid. Such switchover may be relatively smooth because the generator sets have been maintained in phase with the grid while they have been operating. The switch-over may occur, for example, by coordinated switching of components such as switches 110 and 124 in FIG. 1B.

After some time, the generator sets may take over supplying power to the computer data center. However, because they are the primary power provider in this situation, the switch over would generally occur because they are available, and not because of some sudden failure in power from the utility grid. Thus, in such a situation, a controller may spin up the generator sets, align them in phase with the utility grid power, and cause them to be connected to deliver power to the computer data center, and cause the power to stop being delivered from the utility grid.

FIG. 3B generally shows a process by which primary power can be moved from utility or another power source, to a back-up source that is powered by generator sets. The process begins at box 320, where a computer data center is powered from the electric grid. Such operation is a normal state of operation and can be attended by typical controls and monitoring. For example, the power can be conditioned in some implementations to prevent spikes and other grid-related problems from damaging equipment in the computer data center (where the conditioning can occur at a central point, or can be distributed as far out as the power supplies that serve individual computer server systems). Similarly, the power may be routed and re-routed, and otherwise directed outside and inside the computer data center building as is needed to meet the changing power needs of equipment inside the building.

At box 322, the system identifies an event that causes a need for back-up power. The event can be similar to the triggering events described above with respect to FIG. 2A, and can include identification that power from the utility has failed or is starting to fail. For example, sensors in the power distribution system can report back to a control system that power is no longer flowing in the system. Alternatively, computer servers in the system may be programmed to report when they have stopped receiving power (and have switched to battery back-up), and a control system may use such reports and information that correlates computer ID's to computer locations in the computer data center, to identify whether the power outage is isolated or widespread. If the outage is determined to be only isolated, the controller may determine that the problem is in the power distribution system in the computer data center, rather in the availability of power from the utility, for example. As another example of an event that causes a need for back-up power, the utility may signal the controller for the computer data center, that the computer data center should switch to back-up power. For example, a utility may have an agreement with the operator of the computer data center that the computer data center will be switched to back-up power at times when the utility is facing high energy demand, and thus the utility can shed load at such times in cooperation with the operator of the computer data center, with the computer data center switching to back-up power for a predetermined time period or until notified by the utility that it may switch back to utility-based power.

At box 324, the system causes the generator sets to be started automatically via electric starters. The electricity generated by the generator sets may be routed through rectifiers before being combined, so as to make it possible to combine the power without first phase-aligning the AC power coming out of the generating phases of the generator sets (box 326). The combined DC power may then be provided to the computer data center and distributed within the computer data center to power supplies that are arranged to take DC power, and perhaps first to various medium voltage-to-low voltage converters in the data center (e.g., positioned at the top of racks that are served by power form such respective converters). The combined DC power may alternatively be passed through an inverter that may convert it to AC power that has a single phase, and the AC power (at medium voltage, e.g.) may be distributed inside the computer data center. Such distribution may be accomplished via the switching of the data center power supply form the utility grid to the generator sets (box 328).

Thus, by these methods, back-up power may be supplied to a computer data center when a need arises to transition out of primary power. The transition can occur quickly based on, in certain examples, keeping the primary source in phase alignment with a secondary, back-up power source that is available and being generated but not being used by the computer data center, or that can be brought up-to-speed quickly without requiring phase alignment of the sub-sources for the back-up power.

Figure 4:
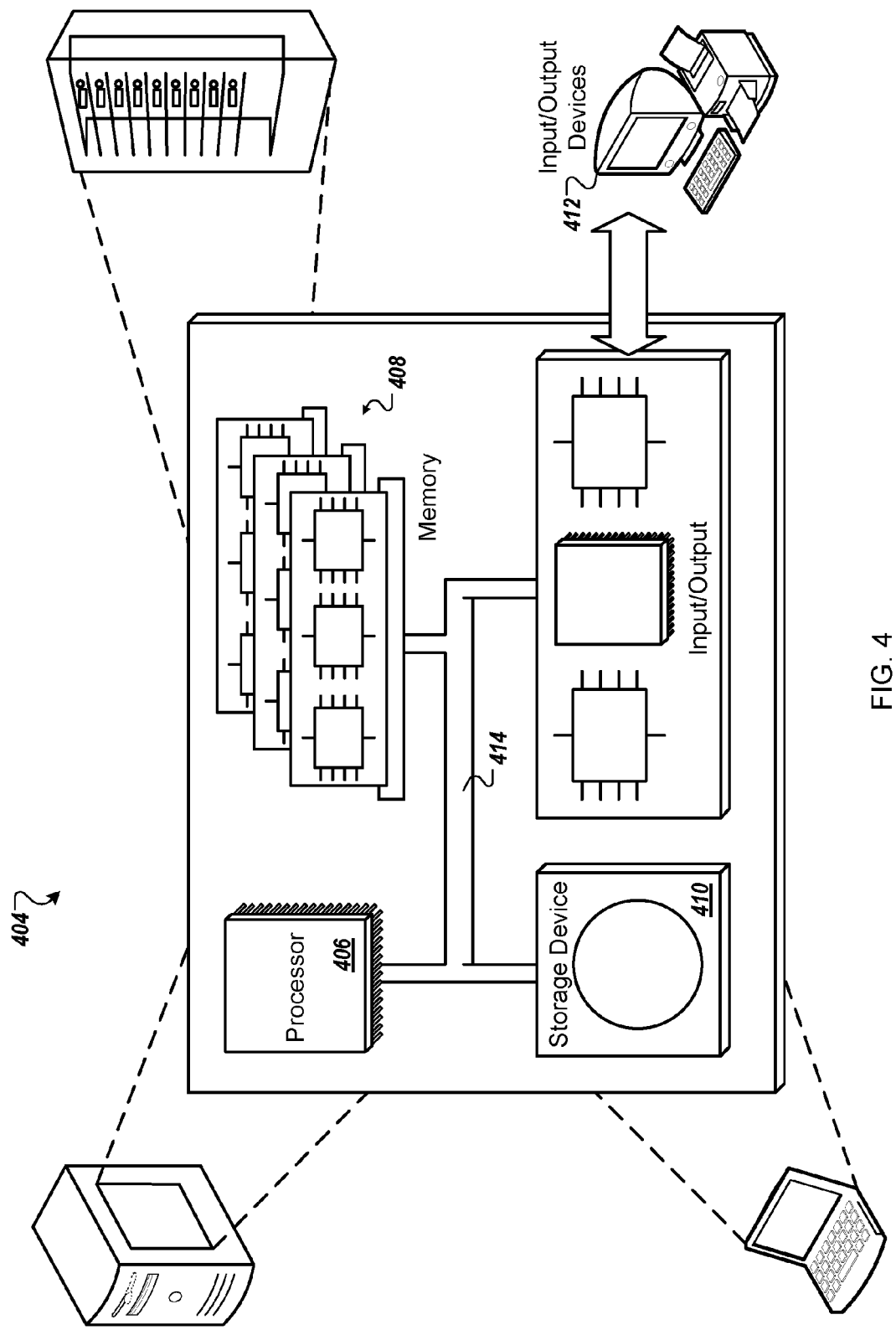
FIG. 4 shows a general computer system that can provide for management and control of electrical energy delivery to a data center.

FIG. 4 shows a general computer system that can provide for management and control of electrical energy delivery to a data center. The system 400 may be implemented in various forms of digital computers, including computerized defibrillators laptops, personal digital assistants, tablets, and other appropriate computers. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. The processor may be designed using any of a number of architectures. For example, the processor 410 may be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having an LCD (liquid crystal display) or LED display for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

Many other implementations other than those described may be employed, and may be encompassed by the following claims.

What is claimed is:

1. A method for providing electrical power to a computer data center, comprising:

powering the computer data center using a plurality of generator sets that are located proximate to the computer data center, the plurality of generator sets comprising a primary power source configured to provide electrical power to the computer data center during a majority of an operational time duration of the computer data center, each generator set in asynchronous phase with respect to the others of the plurality of generator sets;

monitoring an electric power grid electrically coupled to supply an electric power to the computer data center;

controlling the plurality of generator sets to align an alternating current (AC) power phase provided by the generator sets with an AC power phase of the electric power grid;

identifying an occurrence of an event that requires access to a back-up power source that is exclusive of the generator sets; and switching, in response to identifying the occurrence of the event, the electric power supplied to the computer data center from the plurality of generator sets to the electric power grid.

2. The method of claim 1, wherein the plurality of generator sets are configured to produce medium voltage power and are electrically coupled to one or more medium voltage-to-low voltage transformers that serve a predefined sub-portion of the computer data center.

3. The method of claim 2, wherein the predefined sub-portion of the computer data center comprises a predetermined number of rows of computer racks in the computer data center.

4. The method of claim 3, wherein each of the one or more medium voltage-to-low voltage transformers are electrically coupled to electrical computing devices in a predetermined subset of the predetermined number of rows of computer racks.

5. The method of claim 1, further comprising supplying electrical power, from the plurality of generator sets, to a common electric power bus that is electrically coupled to a majority of a plurality of electrical computing devices in the computer data center.

6. The method of claim 5, wherein the common electric power bus is electrically coupled to the plurality of generators by a first electric switching structure, and the common electric power bus is electrically coupled to the electric grid by a second switching structure that is connected to operate in coordination with the first electric switching structure.

7. The method of claim 5, wherein the common electric power bus comprises at least a portion of a single medium voltage domain in the computer data center that serves more than fifty medium-voltage-to-low voltage transformers.

8. The method of claim 5, wherein the common electric power bus comprises at least a portion of a single medium voltage domain in the computer data center that is larger than three megawatts or ten megawatts in size.

9. The method of claim 5, wherein the common electric bus comprises at least a portion of a single medium voltage domain in the computer data center that serves more than about half of the computer data center.

10. A computer data center electrical power system, comprising:

a plurality of generator sets that are located proximate to the computer data center, each generator set in asynchronous phase with respect to the others of the plurality of generator sets;

a phase control system connected to monitor an alternating current (AC) power phase of an electric power grid and to adjust operation of the plurality of generator sets to match an AC power phase of an electrical power produced by the generator sets to the AC power phase of the electric grid while the plurality of generator sets provide primary power to the computer data center;

a monitoring sub-system arranged to monitor a supply of primary power to the computer data center and to identify an event indicating an interruption in the supply of primary power to the computer data center; and a control sub-system programmed to respond to the event from the monitoring sub-system by causing the electrical power provided to the computer data center to be switched from the plurality of generator sets to the electric grid.

11. The system of claim 10, wherein the plurality of generator sets are configured to produce medium voltage power and are electrically coupled to one or more medium voltage-to-low voltage transformers that serve a predefined sub-portion of the computer data center.

12. The system of claim 11, wherein the predefined sub-portion of the computer data center comprises a predetermined number of rows of computer racks in the computer data center.

13. The system of claim 12, wherein each of the one or more medium voltage-to-low voltage transformers are electrically coupled to electrical computing devices in a predetermined subset of the predetermined number of rows of computer racks.

14. The system of claim 10, further comprising a common electric power bus that is electrically coupled to a majority of a plurality of electrical computing devices in the computer data center.

15. The system of claim 14, wherein the common electric power bus is electrically coupled to the plurality of generators by a first electric switching structure, and the common electric power bus is electrically coupled to the electric grid by a second switching structure that is connected to operate in coordination with the first electric switching structure.

16. The system of claim 14, wherein the common electric power bus comprises at least a portion of a single medium voltage domain in the computer data center that serves more than fifty medium-voltage-to-low voltage transformers.

17. The system of claim 14, wherein the common electric power bus comprises at least a portion of a single medium voltage domain in the computer data center that is larger than three megawatts or ten megawatts in size.

18. The system of claim 14, wherein the common electric bus comprises at least a portion of a single medium voltage domain in the computer data center that serves more than about half of the computer data center.

19. The system of claim 10, wherein the computer data center comprises a designed electric load of more than thirty megawatts.

20. A control system for controlling provision of electrical power to a computer data center, comprising:

one or more computer processors; and one or more machine-readable storage media that comprises instructions that when executed by the one or more computer processors, perform operations that comprise:

monitoring a provision of primary power to the computer data center by a plurality of generator sets;

identifying an occurrence of an event that requires access to back-up power independent of the generator sets; and causing, in response to identifying the occurrence of the event, the electrical power supplied to the computer data center to be switched from the generator sets to an electric utility grid.

21. The control system of claim 20, wherein the operation of monitoring comprises monitoring the provision of primary power flowing from the generator sets, through a common electric power bus, and to a plurality of electrical computing devices in the computer data center.

22. The control system of claim 21, wherein the operation of causing electrical power supplied to the computer data center to be switched from the generator sets to the electric utility grid comprises:
  operating a first electric switching structure electrically coupled between the common electric power bus and the plurality of generator sets; and
  operating a second electric switching structure electrically coupled between the common electric power bus and the electric utility grid.

* * * * *